(12) United States Patent
Uusitalo et al.

(10) Patent No.: US 7,643,008 B2
(45) Date of Patent: Jan. 5, 2010

(54) CHANGING KEYS DRAWN ON A DISPLAY AND ACTUATING THEM USING A SENSOR-SCREEN

(75) Inventors: Severi Uusitalo, Hämeenlinna (FI); Antti Aaltonen, Tampere (FI); Jaakko Lehikoinen, Hämeenkyrö (FI); Jussi Impiö, Pälkäne (FI)

(73) Assignee: Nokia Corporation, Espoo (FI)

( * ) Notice: Subject to any disclaimer, the term of this patent is extended or adjusted under 35 U.S.C. 154(b) by 875 days.

(21) Appl. No.: 11/065,169

(22) Filed: Feb. 23, 2005

(65) Prior Publication Data

US 2006/0187211 A1    Aug. 24, 2006

(51) Int. Cl.
*G06F 3/041* (2006.01)
*G09G 5/00* (2006.01)
*G06F 3/02* (2006.01)

(52) U.S. Cl. .................. 345/173; 345/156; 345/168; 178/18.01

(58) Field of Classification Search ......... 345/156–184; 178/18.01, 18.03, 19.01, 20.01
See application file for complete search history.

(56) References Cited

U.S. PATENT DOCUMENTS

| 7,417,625 | B2 * | 8/2008 | Morris | 345/169 |
| 2004/0183834 | A1 * | 9/2004 | Chermesino | 345/773 |
| 2005/0071778 | A1 * | 3/2005 | Tokkonen | 715/822 |

OTHER PUBLICATIONS

ProntoPro TSU7000—www.pronto.philips.com Dec. 23, 2004.

* cited by examiner

*Primary Examiner*—Srilakshmi K Kumar

(57) ABSTRACT

This invention describes a method for changing a keypad layout with keys (e.g., graphics and text) drawn on a display of an electronic device (e.g., wireless portable device, a mobile communication device or a mobile phone) and actuating said keys by a user of the electronic device using a transparent or translucent sensor-screen placed over said keys which are visible by the user. The transparent or translucent sensor-screen can be positioned partially or completely over the display. This invention enables different application/feature specific keypad configurations (shape, size, orientation, number of keys) for mobile devices.

21 Claims, 5 Drawing Sheets

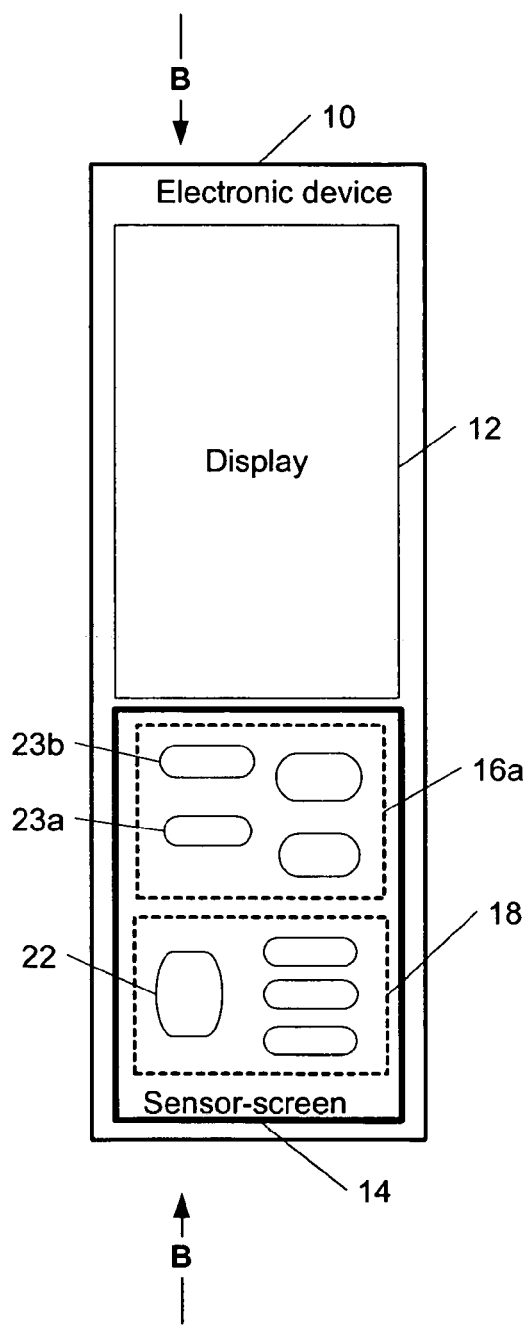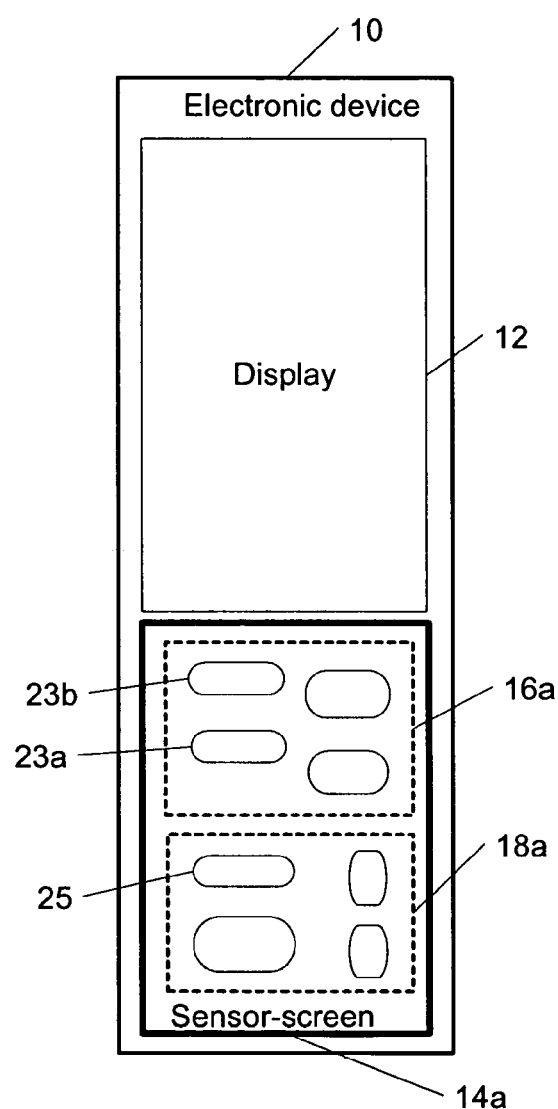
Figure 2a
Figure 2b

CHANGING KEYS DRAWN ON A DISPLAY AND ACTUATING THEM USING A SENSOR-SCREEN

TECHNICAL FIELD

This invention relates to user interface and input technologies in electronic devices and more specifically to changing keys drawn on a display and actuating them using a transparent/translucent sensor-screen (transparent/translucent screen containing sensors).

BACKGROUND ART

Current mobile devices (e.g., mobile phones) can have several different features or applications that require special or dedicated keypad configurations, for example, for camera mode, phone mode, mp3 player mode, etc. The devices can be also used in different orientations, making printed keypad texts unfeasible. From user experience and industrial design standpoint, there is a problem with cluttering the devices with multiple dedicated keys for all the modes as well as adding mechanical components, which can cause problems.

Some applications use keypad keys for providing shortcuts for the frequently used functions. For example, in S60's Gallery application, "3" key is used for rotating image clockwise. However, this kind of functionality requires a lot of learning from the user, which means that it is not suitable for novice/inexperienced users.

There are several options which can be used in electronic device to provide multiple features. There are either soft keys and menu options or multiple hard keys. Currently some of the keypad keys are used as shortcuts and their function can differ according to an application or a mode, regardless of the keypad print.

A touch screen may be also used for providing application-specific controls as in, e.g., Series 90 media player. Ericsson P800/900 has a flip cover over the touch screen with mechanical buttons for pressing areas of the touch screen. Using the touch screen for providing application-specific controls has also problems related to contaminating the screen with greasy fingers or to wearing down the display by scratching, thus decreasing the perceived quality of images on screen, etc. In addition, touch screens are more expensive than normal displays.

DISCLOSURE OF THE INVENTION

The object of the present invention is to provide a methodology for changing keys drawn on a display of an electronic device and actuating these keys using a transparent/translucent sensor-screen (transparent/translucent screen containing sensors).

According to a first aspect of the invention; a method for changing a keypad layout of an electronic device with keys of a keypad drawn on a display of the electronic device and actuating the keys using a transparent or translucent sensor-screen placed over the keys in the electronic device, comprises the steps of: providing a key change command to the electronic device; and drawing new keys on the display by the electronic device in response to the key change command such that the new keys are located under the transparent or translucent sensor-screen, thus changing the keypad layout, and all drawn keys, visible by a user of the electronic device through the transparent or translucent sensor-screen, can be actuated by the user using the transparent or translucent sensor-screen, wherein the transparent or translucent sensor-screen is movable relative to the display.

Further according to the first aspect of the invention, the key change command may be provided by the user of the electronic device.

Still further according to the first aspect of the invention, the key change command may be provided by a system which the electronic device is connected to.

According further to the first aspect of the invention, the key change command may be provided to a key change module of the electronic device and the step of the drawing of the new keys may comprise: providing, in response to the key change command by the key change module to a display driver and controller of the electronic device, a key change signal containing a predetermined new configuration of keys; and providing, in response to the key change signal by the display driver and controller to the display, a display drive signal for drawing the new keys based on the predetermined new configuration of keys.

According still further to the first aspect of the invention, the actuating may comprise the steps of: applying by the user a key actuating signal in an area of the transparent or translucent sensor-screen corresponding to one key out of the all drawn keys for communicating a predetermined command to the electronic device defined by the one key; and providing by the transparent or translucent sensor-screen in response to the key actuating signal an actuator identity signal indicative of position coordinates of the area; and comparing by the electronic device the position coordinates of the area with a map of the all drawn keys, stored in the electronic device, and identifying the one key intended to be actuated; and providing a key command signal indicative of the predetermined command to an appropriate block of the electronic device.

According further still to the first aspect of the invention, the transparent or translucent sensor-screen may have a permanent key area with permanent marks identifying additional keys of the keypad which can be actuated in a similar way as all the drawn keys using the transparent or translucent sensor-screen.

According yet further still to the first aspect of the invention, the transparent or translucent sensor-screen may be moved away at least partially from the display such that the at least one of the all drawn keys is no longer under the transparent or translucent sensor-screen and an area of the display corresponding to the at least one of the all drawn keys is available for displaying other applications available in the electronic device, thus increasing a working area of the display. Further, the electronic device may provide a permanent key layout visible through the transparent or translucent sensor-screen before or after the transparent or translucent sensor-screen is moved away completely or partially from the display and any key of the permanent key layout can be actuated in a similar way as all the drawn keys using the transparent or translucent sensor-screen.

According to a second aspect of the invention, an electronic device capable of changing a keypad layout in response to a key change command, may comprise: a display, for displaying keys of a keypad drawn on the display and for displaying new keys of the keypad drawn on the display in response to a key change command, thus changing the keypad layout; and a transparent or translucent sensor-screen placed over all drawn keys, visible by a user of the electronic device through the transparent or translucent sensor-screen, the all drawn keys can be actuated by the user using the transparent or translucent sensor-screen, wherein the transparent or translucent sensor-screen is movable relative to the display.

According further to the second aspect of the invention, the key change command is provided by the user of the electronic device.

Further according to the second aspect of the invention, the key change command may be provided by a system which the electronic device is connected to.

Still further according to the second aspect of the invention, the electronic device may further comprise: a key change module, responsive to the key change command, for providing a key change signal containing a predetermined new configuration of keys; and a display driver and controller, responsive to the key change signal, for providing a display drive signal for drawing the new keys based on the predetermined new configuration of keys.

According further to the second aspect of the invention, the user may apply a key actuating signal in an area of the transparent or translucent sensor-screen corresponding to one key out of the all drawn keys for communicating a predetermined command to the electronic device defined by the one key, and the transparent or translucent sensor-screen, in response to the key actuating signal, may provide an actuator identity signal indicative of the area. Further, the electronic device may further comprise: a position sensor driver and controller, responsive to the an actuator identity signal, for providing an actuator position signal containing position coordinates of the area; and a position comparator, responsive to the actuator position signal, for comparing the position coordinates of the area with a map of the all drawn keys, stored in the electronic device, for identifying the one key intended to be actuated, and for providing a key command signal indicative of the predetermined command to an appropriate block of the electronic device.

According still further to the second aspect of the invention, the transparent or translucent sensor-screen may have a permanent key area with permanent marks identifying additional keys of the keypad which can be actuated in a similar way as all the drawn keys using the transparent or translucent sensor-screen.

According further still according to the second aspect of the invention, the transparent or translucent sensor-screen may be moved away at least partially from the display such that the at least one of the all drawn keys is no longer under the transparent or translucent sensor-screen and an area of the display corresponding to the at least one of the all drawn keys is available for displaying other applications available in the electronic device, thus increasing a working area of the display. Further, the electronic device may provide a permanent key layout visible through the transparent or translucent sensor-screen before or after the transparent or translucent sensor-screen is moved away completely or partially from the display and any key of the permanent key layout can be actuated in a similar way as all the drawn keys using the transparent or translucent sensor-screen.

According to a third aspect of the invention, an electronic device capable of changing a keypad layout in response to a key change command, comprises: a display, for displaying keys of a keypad drawn on the display and for displaying new keys of the keypad drawn on the display in response to the key change command, thus changing the keypad layout; and a transparent or translucent sensor-screen, placed in a first position, over the display in the electronic device so that all drawn keys, located under the transparent or translucent sensor-screen and visible by a user of the electronic device, can be actuated by the user using the transparent or translucent sensor-screen, or placed in a second position, away from the display, thus increasing a working area of the display, wherein the user can actuate permanent keys not in an area of the display using the transparent or translucent sensor-screen.

According further to the third aspect of the invention, the permanent keys may be permanent marks on a surface of the transparent or translucent sensor-screen visible by the user.

Further according to the third aspect of the invention, a permanent key layout of the permanent keys may be provided by the electronic device and the permanent keys may be visible through the transparent or translucent sensor-screen by the user.

According to a fourth aspect of the invention, a computer program product comprises: a computer readable storage structure embodying computer program code thereon for execution by a computer processor with the computer program code characterized in that it includes instructions, as being performed by any component of an electronic device, for changing a keypad layout of the electronic device with keys of a keypad drawn on a display of the electronic device and actuating the keys using a transparent or translucent sensor-screen placed over the keys in the electronic device, wherein drawing new keys on the display under the transparent or translucent sensor-screen by the electronic device is provided in response to a key change command, such that the new keys are located under the transparent or translucent sensor-screen, thus changing the keypad layout, and all drawn keys visible by a user of the electronic device through the transparent or translucent sensor-screen, can be actuated by the user using the transparent or translucent sensor-screen, wherein the transparent or translucent sensor-screen is movable relative to the display.

The invention provides the following benefits:
  enhanced user experience by reducing user's cognitive workload by providing correctly labeled/marked and application specific information on the keys and by providing only task related controls for the user at a time;
  keeping a display clear from grease and scratching, still providing the same benefits as a touch screen;
  utilizing the keypad functions even when it is not over the display (compared to touch screen) and leaving more screen space available for actual content instead of showing UI controls;
  the size and contrast of the text and graphics can be enhanced for poor lighting conditions or visually impaired users;
  not requiring mechanical parts, which makes the construction robust which can fit in a small space;
  screen-sensors (e.g., capacitive sensors) are cheap to produce, which makes them suitable for entry-level products;
  enables solid cover, which keeps dust and dirt away from the keypad area; and
  not wearing off like key mat printings in heavy use.

BRIEF DESCRIPTION OF THE DRAWINGS

For a better understanding of the nature and objects of the present invention, reference is made to the following detailed description taken in conjunction with the following drawings, in which:

FIG. 2a and FIG. 2b show different keypad configurations of an electronic device with a transparent/translucent sensor-screen removed from the display, according to the present invention;

BEST MODE FOR CARRYING OUT THE INVENTION

Figure 1A:
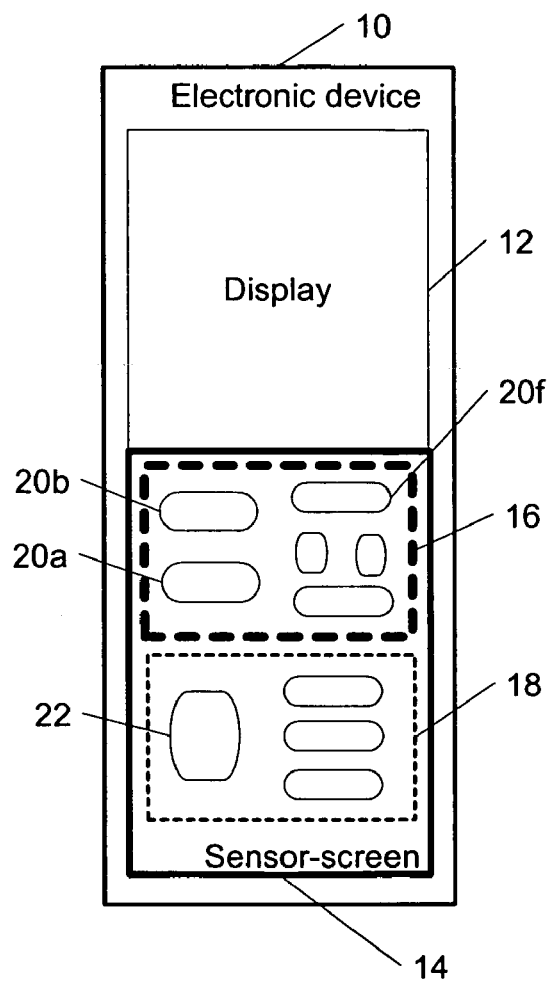
FIG. 1a and FIG. 1b show different keypad configurations of an electronic device, according to the present invention.

The present invention provides a new methodology for changing a keypad layout with keys (e.g., graphics and/or text) drawn on a display of an electronic device (e.g., wireless portable device, a mobile communication device or a mobile phone) and actuating said keys by a user of the electronic device using a transparent or translucent sensor-screen (transparent/translucent screen containing sensors) placed over said keys which are visible by the user.

The transparent or translucent sensor-screen can be positioned partially or completely over the display. This invention enables different application/feature specific keypad configurations (shape, size, orientation, number of keys) for mobile devices. The sensor-screen can be made from, e.g., a suitable polymer and then can be injection molded using standard molding technologies to provide said touch-screen of a desired shape and size.

According to the present invention, in response to an appropriate command, new keys can be drawn on said display, wherein previously drawn keys during the drawing of the new keys can be completely erased, partially erased or not erased at all. The actuating of the keys using the translucent sensor-screen can utilize a plurality of actuation methods including, but not be limited to, a resistive actuation, a capacitive actuation, an optical actuation or an electromagnetic field actuation using a direct mechanical touch with an area of said touch-screen which corresponds to a desired key (to be "pressed", which can be indicated by providing audio, visual and/or tactile feedback) by the user using a stylus or a finger or placing said stylus or said finger in a close proximity to said area.

According to the present invention, the transparent or translucent sensor-screen can have a permanent key area (e.g., with permanent marks on its surface) identifying additional keys of said keypad which can be actuated in a similar way as all keys drawn on the display as described above. Furthermore, the transparent or translucent sensor-screen can be moved away from a change key area of the display where said all drawn keys are located, thus increasing a working area of the display, if necessary. In this situation, according to the present invention, new keys permanently displayed on an electronic device body (e.g., as stickers, different color signs, LEDs, etc.) and visible through the transparent or translucent sensor-screen (as well as keys from said permanent key area mentioned above) again can be actuated in a similar way as all keys drawn on the display as described above.

Figure 1B:
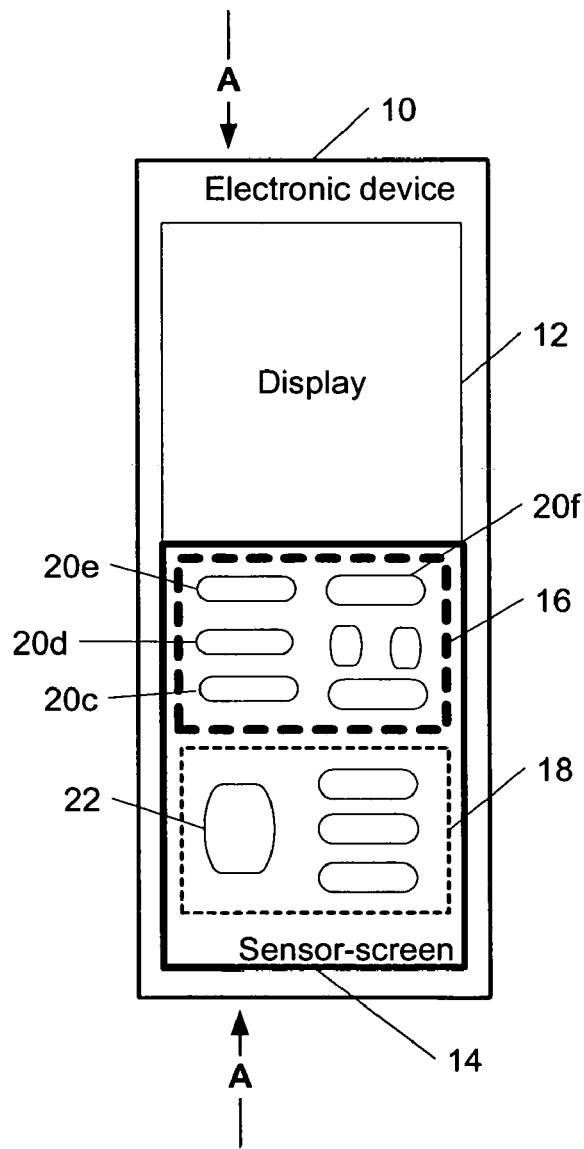

FIG. 1a and FIG. 1b show examples among many other possible scenarios of different keypad configurations of an electronic device 10 (e.g., wireless portable device, a mobile communication device or a mobile phone) illustrating the present invention. A transparent or translucent sensor-screen 14 is placed partially (in general, according to the present invention, it can be places completely) over a display 12 such that a change key area 16 contains a corresponding portion of said display 12 covered by said transparent or translucent sensor-screen 14. Said corresponding portion of the display 12 contains keys, e.g., keys 20a and 20b in FIG. 1a, drawn on a display 12 as a graphics, a text, or a combination thereof which are visible by a user 24 (shown in FIG. 3) of said electronic device 10 and can be actuated by the user 24 according to the present invention, as described above and in more detail below.

According to the present invention, in response to an appropriate command (as described below), new keys, e.g., 20c, 20d and 20e in FIG. 1b, can be drawn on the display 12, thus changing a keypad layout, wherein previously drawn keys during the drawing of the new keys can be completely erased, partially erased or not erased at all. For example, the original (or previously drawn) key 20f (and some other keys as visible in FIG. 1b) is not erased during drawing the new keys 20c, 20d and 20e.

Furthermore, according to the present invention, the transparent or translucent sensor-screen 14 can have a permanent key area 18 shown in FIGS. 1a and 1b with permanent marks, e.g., see a key 22 on its surface, identifying additional keys of the keypad layout which can be actuated in a similar way as all keys drawn on the display as described above. The permanent marks can be corrugations on the surface of the transparent or translucent sensor-screen 14 or identified by a plurality of other types of visible signs such as stickers, colored signs, etc.

FIG. 2a and FIG. 2b show examples among many other possible scenarios of different keypad configurations of an electronic device 10 with a transparent/translucent sensor-screen 14 removed from the display 12 according to the present invention. In FIGS. 2a and 2b the transparent or translucent sensor-screen 14 is moved away completely or partially (e.g. slid, flipped, or rotated) from the change key area 16 containing the corresponding portion of said display 12 where said all drawn keys (new and original) are located, thus increasing a working area of the display 12 (e.g., the total display area of the display 12 can be utilized for displaying data or images). If said transparent or translucent sensor-screen 14 is moved away only partially, certain remaining keys in said change key area 16 which are displayed on the display 12 and still under the transparent or translucent sensor-screen 14 and visible by the user 24 can be actuated using said transparent or translucent sensor-screen 14 as described above and in more detail below.

Moreover, according to the present invention, the keys identified in the permanent key area 18 shown in FIG. 2a and also shown in FIGS. 1a and 1b can be used (actuated) exactly the same way as described above (and in more detail below). In addition, new keys, e.g., 23a and 23b, permanently imbedded on an electronic device body (e.g., as stickers, different color signs, LEDs, etc.) in a further permanent display area 16a as shown in FIG. 2a and visible through the transparent or translucent sensor-screen 14 again can be actuated in a similar way as all keys drawn on the display as described above (and in more detail below). It is noted that, according to the present invention, the keys 23a and 23b can be visible by the user 24 through the transparent or translucent sensor-screen 14 before said sensor-screen 14 is moved away, so these keys 23a and 23b can be actuated the same way as described above using said sensor-screen 14.

FIG. 2b shows one possible modification (among many others) of the option of FIG. 2a, according to the present invention. In FIG. 2b an area of the transparent or translucent sensor-screen 14a, corresponding to the permanent key area 18 (shown in FIGS. 1a, 1b and 2a) before the sensor-screen 14a is moved away, can be free of any permanent marks on its surface (the sensor-screen 14a differs from the sensor-screen 14 because it does not have any permanent marks on its surface), such that still further permanent area 18a in FIG. 2b can have further new keys permanently imbedded on an electronic device body (e.g., as stickers, different color signs, LEDs, etc.) and visible through the transparent or translucent sensor-screen 14 which (said further new keys) can be again actuated in a similar way as all keys drawn on the display as described above (and in more detail below). Thus, design and operation of the still further permanent area 18a is similar to the further permanent display area 16a, shown in FIGS. 2a and 2b.

Figure 3:
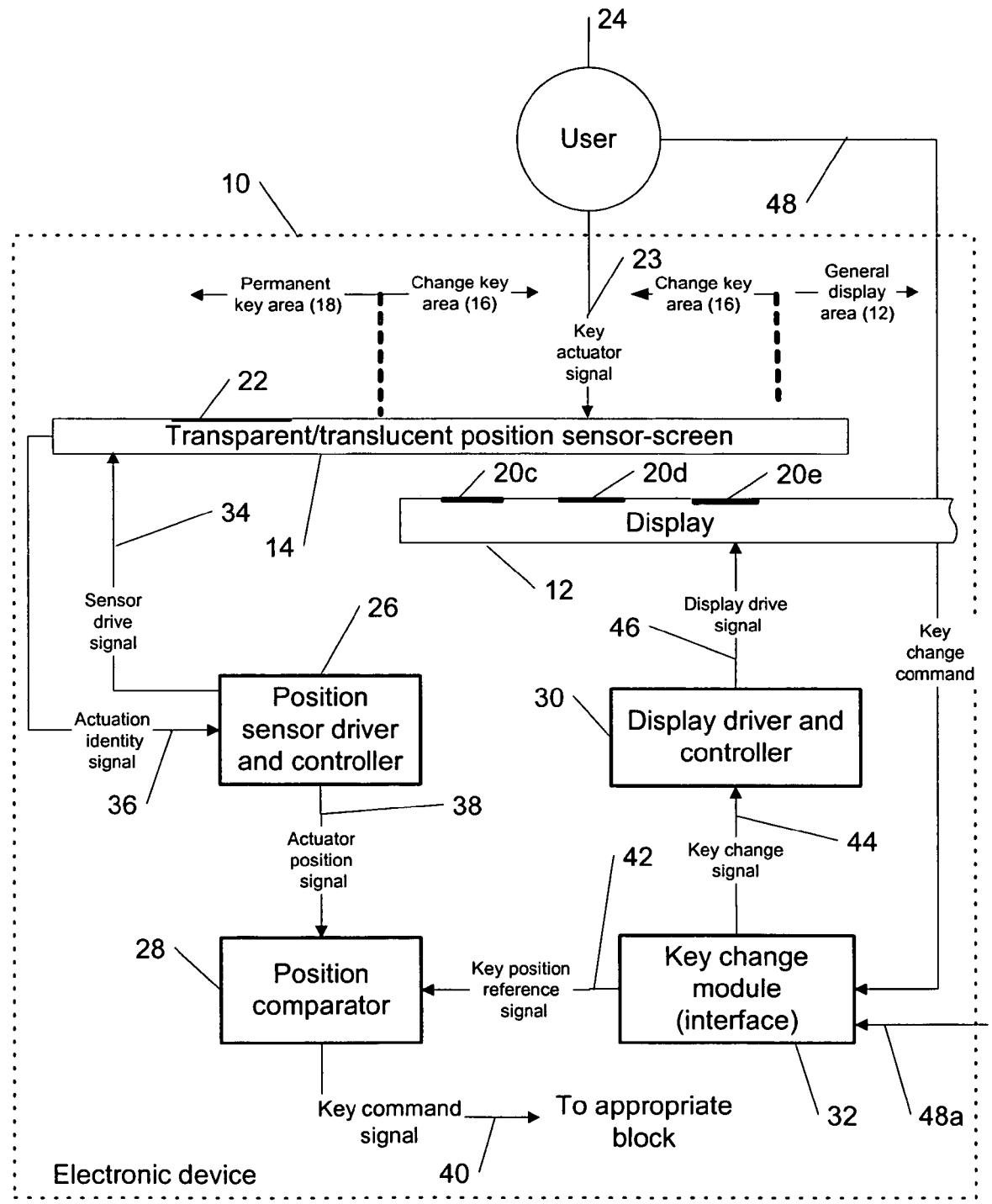
FIG. 3 is a block diagram of an electronic device demonstrating a concept of changing keys drawn on a display and actuating these keys using a transparent/translucent sensor-screen, according to the present invention.

FIG. 3 is one example among many others of a block diagram of an electronic device 10 demonstrating a concept of changing keys drawn on a display 12 and actuating these keys using a transparent or translucent sensor-screen 12, according to the present invention. Elements 14 and 12 in FIG. 3 are shown as a cross-sectional view across a line AA of FIG. 1b.

New keys 20c, 20d, 20e are drawn on the display 12 in response to a key change command 48 or 48a, thus changing said keypad layout, so that said new keys 20c, 20d, 20e are visible by the user 24 of the electronic device 10 through the transparent or translucent sensor-screen 14 and can be actuated by said user 24 using said transparent or translucent sensor-screen 14 as described in detail below. The key change command 48 or 48a, respectively, can be provided by the user 24 or by a system which said electronic device 10 is connected to. The key change command 48 or 48a can be, for example, based on a particular application, specific to a particular user, relevant to a specific solution, necessitated by attaching new accessories to the electronic device 10, etc.

In the example of FIG. 3, the key change command 48 or 48a is provided to a key change module 32. In response to the key change command 48 or 48a, the key change module 32 provides a key change signal 44 containing a predetermined new configuration of keys to a display driver and controller 30. In response to said key change signal 44, the display driver and controller 30 provided to the display 12 a display drive signal 46 for drawing the new keys 20c, 20d, 20e based on said predetermined new configuration of keys. A new map of all drawn keys on the display 12 is stored in the electronic device 10, wherein optionally a key position reference signal 42 containing said new map can be provided by the key change module 32 to a position comparator 28 (used for actuating as described below) of the electronic device 10.

For actuating an appropriate key (e.g., the key 20d out of said all drawn keys 20c, 20d, 20e, etc.), the user 14 applies a key actuating signal 23 in an area of the transparent or translucent sensor-screen 14 corresponding to the key 20d for communicating a predetermined command defined by the key 20d to said electronic device 10, wherein the key actuating signal 23 can be provided by a direct mechanical touch with said area of the transparent or translucent sensor-screen 14 by the user 24 using a stylus or a finger or by placing said stylus or said finger in a close proximity to said area. A method of providing the key actuating signal 23 is determined by a type of actuation principle of the transparent or translucent sensor-screen 14 which can utilize among others a resistive actuation, a capacitive actuation, an optical actuation or an electromagnetic field actuation. These actuation principles are well known in the art.

The transparent or translucent sensor-screen 14, in response to said key actuating command 23, provides an actuator identity signal 36 indicative of position coordinates of said area to a position sensor driver and controller 26. The position sensor driver and controller 26, in response to the actuator identity signal 36, provides an actuator position signal 38 containing position coordinates of said area to a position comparator 28. The position comparator 28, in response to the actuator position signal 38, compares said position coordinates of said area with the map of said all drawn keys, stored in said electronic device 10, for identifying the key 20d intended to be actuated. After identifying the key 20d, the position comparator 28 provides a key command signal 40 indicative of the predetermined command to an appropriate block of said electronic device 10. In an alternative implementation of the present invention, the actuator identity signal 36 can be provided directly to the position comparator 28 and the position coordinates of said area can be directly derived by the position comparator 28.

Figure 4:
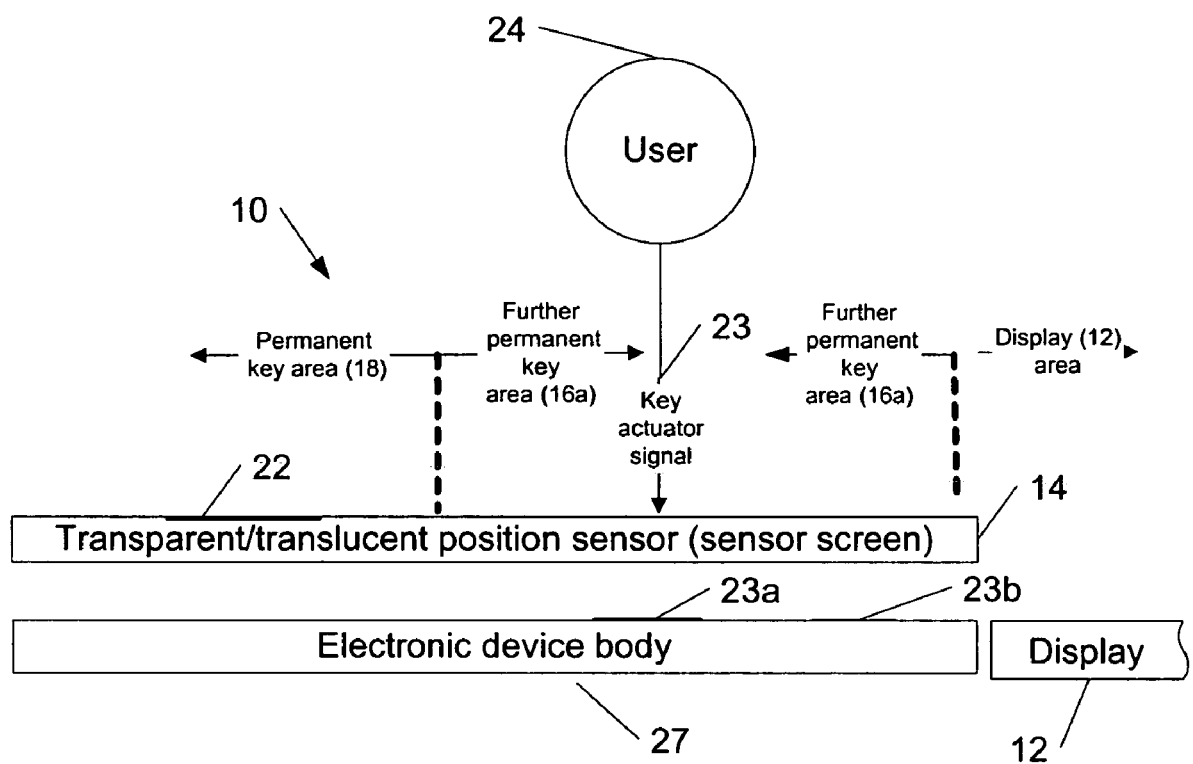
FIG. 4 is a cross-sectional view demonstrating a concept of removing a transparent/translucent sensor-screen from a display area, according to the present invention.

FIG. 4 is one example among many others of a cross-sectional view further demonstrating a concept of removing a transparent/translucent sensor-screen 14 from a display 12 area, according to the present invention. Elements 14, 21 and 27 in FIG. 4 are shown as a cross-sectional view across a line BB of FIG. 2a. As seen in FIG. 4, the transparent or translucent sensor-screen 14 is completely moved away from the display 12 area.

Moreover, according to the present invention, the keys (e.g., the key 22) identified in the permanent key area 18 can be used (actuated) exactly the same way as described above. In addition, the new keys, e.g., 23a and 23b, permanently displayed on an electronic device body 27 (e.g., as stickers, different color signs, LEDs, etc.) in a further permanent display area 16a visible through the transparent or translucent sensor-screen 14 again can be actuated in a similar way as described above.

Figure 5:
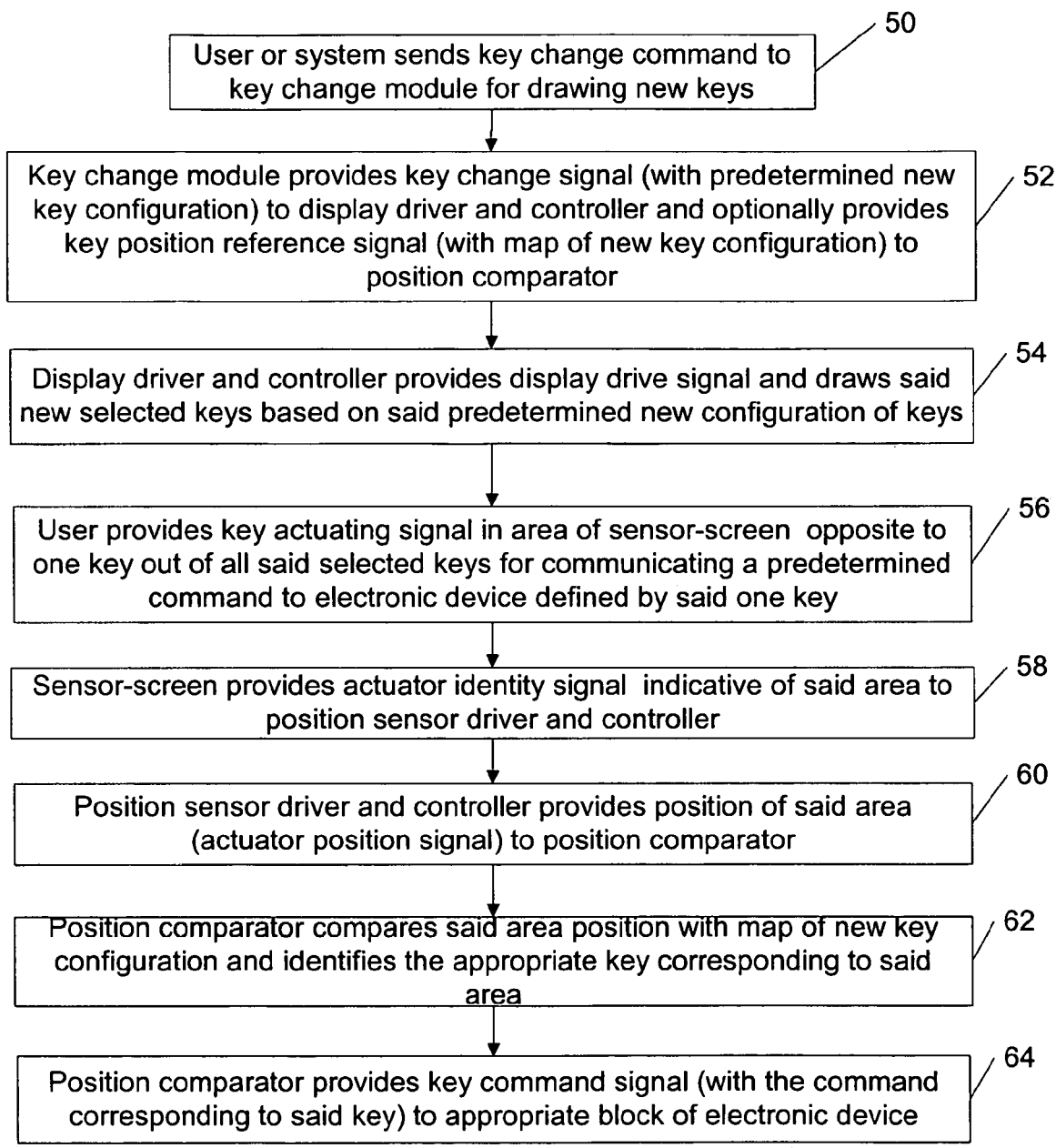
FIG. 5 is a flow chart demonstrating a concept of changing keys drawn on a display of an electronic device and actuating these keys using a transparent/translucent sensor-screen, according to the present invention.

FIG. 5 is a flow chart demonstrating a concept of changing keys drawn on the display 12 of the electronic device 10 and actuating these keys using the transparent/translucent sensor-screen 14, according to the present invention.

The flow chart of FIG. 5 represents only one possible scenario among many others. In a method according to the present invention, in a first step 50, the user 24 or the system connected to the electronic device 10 sends the key change command 48 or 48a, respectively, to the key change module 32 for drawing new keys. In a next step 52, the key change module 32 provides the key change signal 44 (with the predetermined new key configuration) to the display driver and controller 30 and optionally provides the key position reference signal 42 (with the map of the new key configuration) to the position comparator 28. In a next step 54, the display driver and controller 30 provides the display drive signal 46 to the display 12 and draws said new keys (e.g., key 20c, 20b and 20c) based on said predetermined new configuration of keys.

In a next step 56, the user 14 provides the key actuating signal 23 (as described above) in an area of the transparent or translucent sensor-screen 14 opposite to one key (e.g., the key 20d) out of all said drawn keys (20c, 20d, 20e, 20f, etc.), for communicating the predetermined command to the electronic device 10 defined by said one key. In a next step 58, the sensor-screen 14, in response to said key actuating command 23, provides the actuator identity signal 36 indicative of the position coordinates of said area to the position sensor driver and controller 26. In a next step 60, the position sensor driver and controller 26, in response to the actuator identity signal 36, provides the actuator position signal 38 containing position coordinates of said area to the position comparator 28.

In a next step 62, the position comparator 28, in response to the actuator position signal 38, compares the position coordinates of said area with the map of said all drawn keys (a new key configuration), stored in said electronic device 10 or optionally provided to the position comparator 28, and identifies the key 20d intended to be actuated. Finally, in a step 64, the position comparator 28 provides the key command signal 40 indicative of the predetermined command to the appropriate block of said electronic device 10.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
    providing a key change command to said electronic device comprising keys of a keypad drawn on a display of said electronic device and a transparent or translucent sensor-screen placed over said keys for actuating said keys; and
    drawing new keys on said display by said electronic device in response to said key change command for changing a keypad layout such that said new keys are located under said transparent or translucent sensor-screen, and all drawn keys, visible through said transparent or translucent sensor-screen, can be actuated using said transparent or translucent sensor-screen,
    wherein said transparent or translucent sensor-screen is movable relative to said display.

2. The method of claim 1, wherein said key change command is provided by a user of said electronic device.

3. The method of claim 1, wherein said key change command is provided by a system which said electronic device is connected to.

4. The method of claim 1, wherein said key change command is provided to a key change module of said electronic device and said drawing of said new keys comprises:
    providing, in response to said key change command by said key change module to a display driver and controller of said electronic device, a key change signal containing a predetermined new configuration of keys; and
    providing, in response to said key change signal by said display driver and controller to said display, a display drive signal for drawing said new keys based on said predetermined new configuration of keys.

5. The method of claim 1, wherein said actuating comprises:
    applying b a key actuating signal in an area of said transparent or translucent sensor-screen corresponding to one key out of said all drawn keys for communicating a predetermined command to said electronic device defined by said one key;
    providing by said transparent or translucent sensor-screen in response to said key actuating signal an actuator identity signal indicative of position coordinates of said area;
    comparing by said electronic device said position coordinates of said area with a map of said all drawn keys, stored in said electronic device, and identifying said one key intended to be actuated; and
    providing a key command signal indicative of said predetermined command to an appropriate block of said electronic device.

6. The method of claim 1, wherein said transparent or translucent sensor-screen has a permanent key area with permanent marks identifying additional keys of said keypad which can be actuated in a similar way as all said drawn keys using said transparent or translucent sensor-screen.

7. The method of claim 1, wherein said transparent or translucent sensor-screen is moved away at least partially from said display such that said at least one of said all drawn keys is no longer under said transparent or translucent sensor-screen, and an area of said display corresponding to said at least one of said all drawn keys is available for displaying other applications available in said electronic device for increasing a working area of said display.

8. The method of claim 7, wherein said electronic device provides a permanent key layout visible through said transparent or translucent sensor-screen before or after said transparent or translucent sensor-screen is moved away completely or partially from said display and any key of said permanent key layout can be actuated in a similar way as all said drawn keys using said transparent or translucent sensor-screen.

9. An electronic device, comprising:
    a display, configured to display keys of a keypad drawn on said display and configured to change a keypad layout by displaying new keys of said keypad drawn on said display in response to a key change command; and
    a transparent or translucent sensor-screen placed over all drawn keys, visible through said transparent or translucent sensor-screen, such that said all drawn keys can be actuated using said transparent or translucent sensor-screen,
    wherein said transparent or translucent sensor-screen is movable relative to said display.

10. The electronic device of claim 9, wherein said key change command is provided by said user of said electronic device.

11. The electronic device of claim 9, wherein said key change command is provided by a system which said electronic device is connected to.

12. The electronic device of claim 9, further comprising:
    a key change module, responsive to said key change command, configured to provide a key change signal containing a predetermined new configuration of keys; and
    a display driver and controller, responsive to said key change signal, configured to provide a display drive signal for drawing said new keys based on said predetermined new configuration of keys.

13. The electronic device of claim 9, wherein a key actuating signal is applied in an area of said transparent or translucent sensor-screen corresponding to one key out of said all drawn keys for communicating a predetermined command to said electronic device defined by said one key, and said transparent or translucent sensor-screen, in response to said key actuating signal, is configured to provide an actuator identity signal indicative of said area.

14. The electronic device of claim 13, further comprising:
    a position sensor driver and controller, responsive to said an actuator identity signal, configured to provide an actuator position signal containing position coordinates of said area; and
    a position comparator, responsive to said actuator position signal, configured to compare said position coordinates of said area with a map of said all drawn keys, stored in said electronic device, for identifying said one key intended to be actuated, and configured to provide a key command signal indicative of said predetermined command to an appropriate block of said electronic device.

15. The electronic device of claim 9, wherein said transparent or translucent sensor-screen has a permanent key area with permanent marks identifying additional keys of said keypad which can be actuated in a similar way as all said drawn keys using said transparent or translucent sensor-screen.

16. The electronic device of claim 9, wherein said transparent or translucent sensor-screen is configured to be moved away at least partially from said display such that said at least one of said all drawn keys is no longer under said transparent or translucent sensor-screen, and an area of said display corresponding to said at least one of said all drawn keys is available for displaying other applications available in said electronic device for increasing a working area of said display.

17. The electronic device of claim 9, wherein said electronic device is configured to provide a permanent key layout visible through said transparent or translucent sensor-screen before or after said transparent or translucent sensor-screen is moved away completely or partially from said display, and any key of said permanent key layout can be actuated in a similar way as all said drawn keys using said transparent or translucent sensor-screen.

18. An electronic device, comprising:
   a display, configured to display keys of a keypad drawn on said display and configured to change a keypad layout by displaying new keys of said keypad drawn on said display in response to a key change command; and
   a transparent or translucent sensor-screen,
   said transparent or translucent sensor-screen placed in a first position, over said display in said electronic device so that all drawn keys, located under said transparent or translucent sensor-screen and visible, can be actuated using said transparent or translucent sensor-screen, or
   said transparent or translucent sensor-screen placed in a second position, away from said display for increasing a working area of said display,
   wherein permanent keys located not in an area of said display can be actuated using said transparent or translucent sensor-screen.

19. The electronic device of claim 18, wherein said permanent keys are permanent marks on a surface of said transparent or translucent sensor-screen visible by the user of said electronic device.

20. The electronic device of claim 18, wherein a permanent key layout of said permanent keys is provided by said electronic device, and said permanent keys are visible through said transparent or translucent sensor-screen.

21. A computer program product comprising: a computer readable storage structure embodying computer program code thereon for execution by a computer processor with said computer program code wherein said computer program code comprises instructions for changing a keypad layout of said electronic device with keys of a keypad drawn on a display of said electronic device and actuating said keys using a transparent or translucent sensor-screen placed over said keys in said electronic device,
   wherein drawing new keys on said display under said transparent or translucent sensor-screen by said electronic device for changing said keypad layout is provided in response to a key change command, such that said new keys are located under said transparent or translucent sensor-screen, and all drawn keys, visible through said transparent or translucent sensor-screen, can be actuated using said transparent or translucent sensor-screen,
   wherein said transparent or translucent sensor-screen is movable relative to said display.

\* \* \* \* \*

UNITED STATES PATENT AND TRADEMARK OFFICE
CERTIFICATE OF CORRECTION

PATENT NO.        : 7,643,008 B2
APPLICATION NO.   : 11/065169
DATED             : January 5, 2010
INVENTOR(S)       : Severi Uusitalo et al.

It is certified that error appears in the above-identified patent and that said Letters Patent is hereby corrected as shown below:

In column 9, line 12 (claim 1, line 2) "said" should be --an--.

In column 10, line 25 (claim 10, line 2) "said" should be --a--.

In column 10, line 59 (claim 15, line 2) "has a" should be --comprises--.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,643,008 B2  Page 1 of 1
APPLICATION NO. : 11/065169
DATED : January 5, 2010
INVENTOR(S) : Uusitalo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1349 days.

Signed and Sealed this

Twenty-first Day of December, 2010

David J. Kappos
*Director of the United States Patent and Trademark Office*